(12) United States Patent
Westerman

(10) Patent No.: US 6,771,839 B2
(45) Date of Patent: Aug. 3, 2004

(54) EFFICIENT METHOD OF COMPUTING GAMMA CORRECTION TABLES

(75) Inventor: Larry Alan Westerman, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 546 days.

(21) Appl. No.: 09/789,403

(22) Filed: Feb. 20, 2001

(65) Prior Publication Data

US 2002/0149806 A1 Oct. 17, 2002

(51) Int. Cl.[7] .................................................. G06K 9/40
(52) U.S. Cl. ................................. 382/274; 358/519
(58) Field of Search ............................ 382/274, 254, 382/162, 167; 358/519, 518, 523, 447; 348/671, 674

(56) References Cited

U.S. PATENT DOCUMENTS

| | | | |
|---|---|---|---|
| 4,783,703 A | 11/1988 | Murakoshi et al. | |
| 5,057,919 A | 10/1991 | de Haan et al. | |
| 5,196,924 A | * 3/1993 | Lumelsky et al. | .......... 348/674 |
| 5,258,783 A | 11/1993 | Sasanuma et al. | |
| 5,265,200 A | 11/1993 | Edgar | |
| 5,363,318 A | 11/1994 | McCauley | |
| 5,566,372 A | 10/1996 | Ikeda et al. | |
| 5,589,954 A | 12/1996 | Watanabe | |
| 5,710,871 A | 1/1998 | Tadenuma et al. | |
| 5,726,759 A | * 3/1998 | Watanabe et al. | .......... 358/296 |
| 5,748,773 A | 5/1998 | Tashiro et al. | |
| 5,805,295 A | 9/1998 | Mikami | |
| 5,881,211 A | 3/1999 | Matsumura | |
| 6,130,763 A | 10/2000 | Ohta et al. | |
| 6,148,158 A | 11/2000 | Amemiya | |
| 6,154,288 A | * 11/2000 | Watanabe | .................... 358/1.9 |
| 6,166,781 A | 12/2000 | Kwak et al. | |

* cited by examiner

*Primary Examiner*—Von J. Couso
(74) *Attorney, Agent, or Firm*—Karen Dana Oster

(57) ABSTRACT

An efficient method of computing gamma correction tables of the present invention includes the following steps: determining a gamma correction equation between luminance values produced between two representations; determining at least one polynomial approximation to the gamma correction equation, the at least one polynomial approximation having coefficient values $c_j$; for each coefficient value $c_j$, grouping together all of the coefficient values over a range of $\gamma$ and then fitting a polynomial equation to each grouping to get a respective coefficient polynomial equation; computing coefficients for a given value of $\gamma$ using the coefficient polynomial equations; computing gamma conversion transformations using the computed coefficients and a simplified mathematical formula; and storing the computed gamma conversion transformations in a gamma correction table.

27 Claims, 3 Drawing Sheets

EFFICIENT METHOD OF COMPUTING GAMMA CORRECTION TABLES

BACKGROUND OF INVENTION

This invention relates to conversion tables that may be used in applications such as image reproduction devices. For example, the invention may be used for gamma correction of luminance (light) or chrominance (color) values in the display of images.

Digital images are made up of a plurality of discrete, regularly spaced points (pixels) in an image plane. Each pixel is given a set of three, eight-bit values representing red, green, and blue intensities. Digital images are defined by the pixels in the image plane. Typically, image data consists of sets of three, eight-bit values for each pixel location. Video images are often represented by eight-bit luminance values and one or more color-difference (chrominance) values.

Conversion of images from one physical or logical representation to another, such as by scanning a printed image into a computer memory or converting between digital formats, often results in a particular distortion of the relationship between, for example, the luminance of a color component and the numerical representation of the component, or vice-versa. This occurs, for example, when a computer image, stored as a set of chrominance values in the range 0 to 255, is displayed on a computer monitor screen or printed. The actual luminance produced by the pixels in the image will not correspond linearly to the values in the computer memory. In this case, the luminance values produced by the display often bear a power relationship to the values in the computer memory, of the form $$L(x,y) = L_{max}(N(x,y)/N_{max})^{\gamma} \quad (1)$$

where $N(x, y)$ is the numerical value at location $(x, y)$, $N_{max}$ is the maximum numerical value of the representation, $L_{max}$ is the luminance corresponding to the maximum numerical value, and $L(x, y)$ is the luminance value to location $(x, y)$. The coefficient $\gamma$ is the power exponent describing the relationship. The transformation described by equation (1) is commonly called gamma correction in the imaging literature. The value of the coefficient $\gamma$ varies with the type of display or the physical nature of the reproduction process. For example, for television CRT displays, the relationship between the applied voltage and the resulting luminance is a gamma function with value $\gamma \approx 2.2$.

In analog systems, a nonlinear electronic circuit generates the gamma correction transformation. Exemplary prior art that uses electronic circuits to perform gamma conversion includes U.S. Pat. No. 4,783,703 to Murakoshi et al. entitled "Television Flicker Preventing Circuit With Gamma Value Conversion Prior To Field-To-Frame Conversion," and U.S. Pat. No. 5,057,919 to de Haan et al. entitled "Picture Signal Interpolation Circuit With Gamma Compensation."

For digital systems, the direct computation of the power function is typically too complex for real-time implementation, so that the transformation is often precomputed, with the input/output relationship stored in a lookup table with one entry for each discrete value of the input variable. The transformation is performed on a pixel-by-pixel basis by reference to this table. An exemplary prior art reference that uses a lookup table to perform gamma conversion is U.S. Pat. No. 5,363,318 to McCauley entitled "Method And Apparatus For Adaptive Color Characterization And Calibration." Similarly, U.S. Pat. No. 5,258,783 to Sasanuma et al., entitled "Image Processing Method And Apparatus With Gamma-Correction Control," discloses the creation of a gamma correction table by direct measurement of the output of an image processing device (a copier or printer) with a photosensor, and construction of the correction table from the results. Still further, U.S. Pat. No. 5,566,372 to Ikeda et al., entitled "Image Forming Apparatus And Method Having Gradation Control In A Dense Area In Which Gradation Characteristics Are Non-Linear," discloses the creation of a conversion table based upon direct measurement of the input/output characteristics.

When only one value of $\gamma$ is utilized within a system, the table approach is efficient and effective. When $\gamma$ can be varied by the user of the system, however, the table approach becomes problematic, since the values in the table must be changed whenever the gamma ($\gamma$) coefficient is changed. Problems may include, for example, time consuming computations and/or resource (memory or processor) hungry computations.

In some systems, a multiplicity of tables are precomputed, and the choices of $\gamma$ are limited to those preselected values. One such system is disclosed in U.S. Pat. No. 5,589,954 to Watanabe, entitled "$\gamma$-Correction Curve Selecting Apparatus And A $\gamma$-Correction Curve Creating Apparatus." The Watanabe disclosure sets forth a gamma correction curve generating system, of unspecified form, that generates a plurality of correction curves, and an apparatus which selects among the curves for the most suitable curve. In some systems the conversion table may be recomputed whenever $\gamma$ is changed, but this requires the inclusion into the system of software or hardware to perform complex transcendental mathematical functions.

BRIEF SUMMARY OF THE INVENTION

The current invention permits the computation of a gamma conversion table using a simplified mathematical formula, the coefficients of which are computed from stored coefficients. The method requires a minimum number of stored values, but can compute the gamma conversion table, to reasonable accuracy, for any value of gamma in a wide range, using simplified formulae.

Specifically, an efficient method of computing gamma correction tables of the present invention includes the first step of determining a gamma correction equation between luminance values produced between two representations. The next step is to determine at least one polynomial approximation to the gamma correction equation, the at least one polynomial approximation having coefficient values $c_i$. For each coefficient value $c_i$, the next step is to group together all of the coefficient values over a range of $\gamma$ and then to fit a polynomial equation to each grouping to get a respective coefficient polynomial equation. Then coefficients for a given value of $\gamma$ are computed using the coefficient polynomial equations. The next step is to compute gamma conversion transformations using the computed coefficients and a simplified mathematical formula. Finally, the computed gamma conversion transformations are stored in a gamma correction table.

In a general application of the present invention the efficient method computes conversion tables generally. Specifically, the general method includes the step of determining a non-linear transform between input values in a first range and output values in a second range, the non-linear transform having at least one adjustable parameter. Next at least one approximation equation to the non-linear transform, having coefficient values $c_i$, is determined. Then, for each coefficient value $c_i$, all of the coefficient values over a range of the at least one adjustable parameter are grouped together and an approximation to each grouping is fit to get a respective coefficient approximation equation. Coefficients for a given value of the at least one adjustable parameter are then computed using the coefficient approximation equations. Conversion transformations are then computed using the computed coefficients and a simplified mathematical formula. Finally, the computed conversion transformations are stored in a conversion table.

The foregoing and other objectives, features, and advantages of the invention will be more readily understood upon consideration of the following detailed description of the invention, taken in conjunction with the accompanying drawings.

DETAILED DESCRIPTION OF THE INVENTION

This invention relates to image facsimile devices, more specifically the gamma correction of luminance or chrominance values in the display of images.

Figure 1:
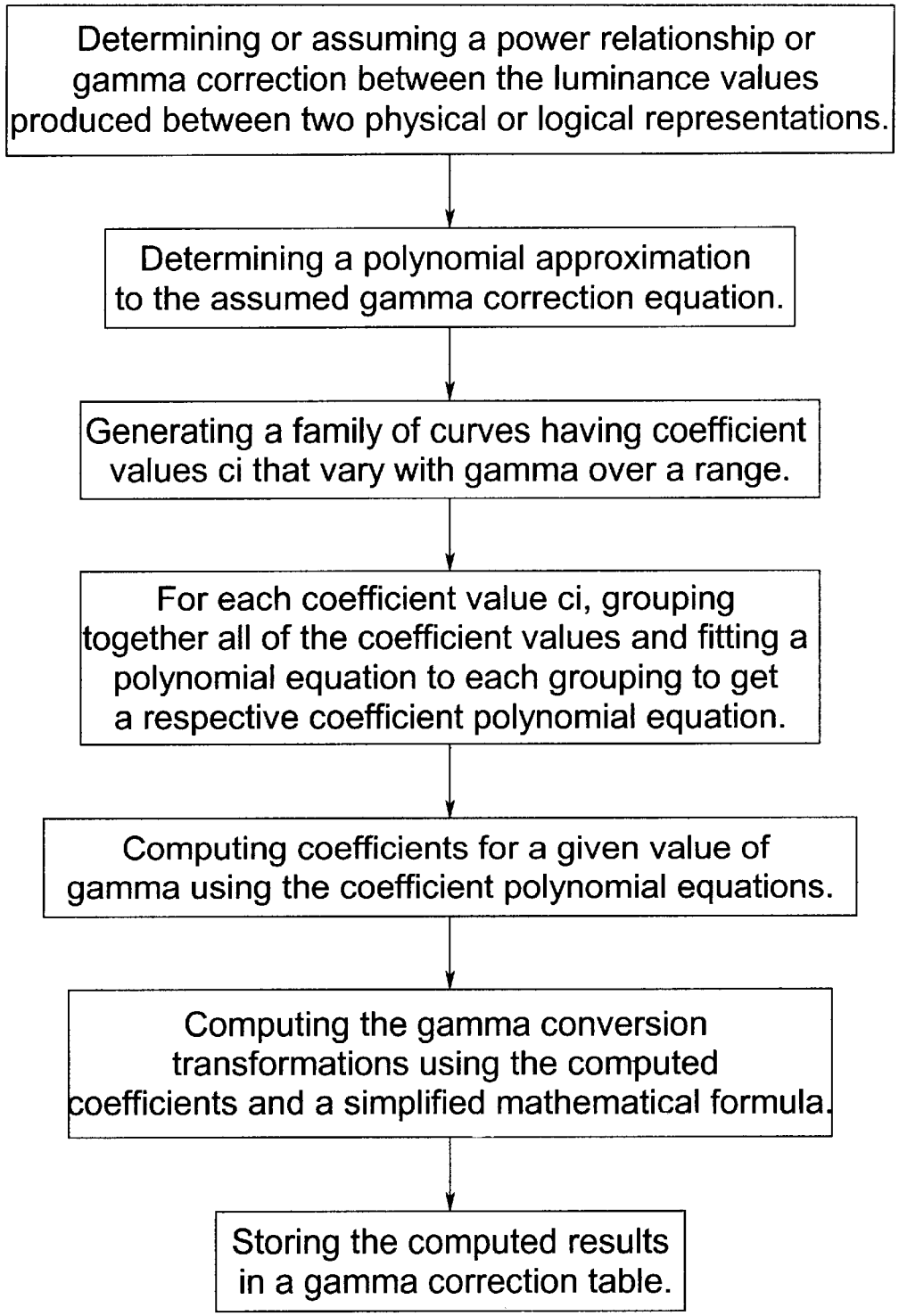
FIG. 1 is a flow chart showing the steps of an exemplary efficient method of computing gamma correction tables of the present invention.

The current invention permits the computation of a gamma conversion table using a simplified mathematical formula, the coefficients of which are computed from stored coefficients. The method requires a minimum number of stored values, but can compute the gamma conversion table, to reasonable accuracy, for any value of gamma in a wide range, using simplified formulae. FIG. 1 shows an exemplary efficient method of computing gamma correction tables of the present invention.

Figure 2:
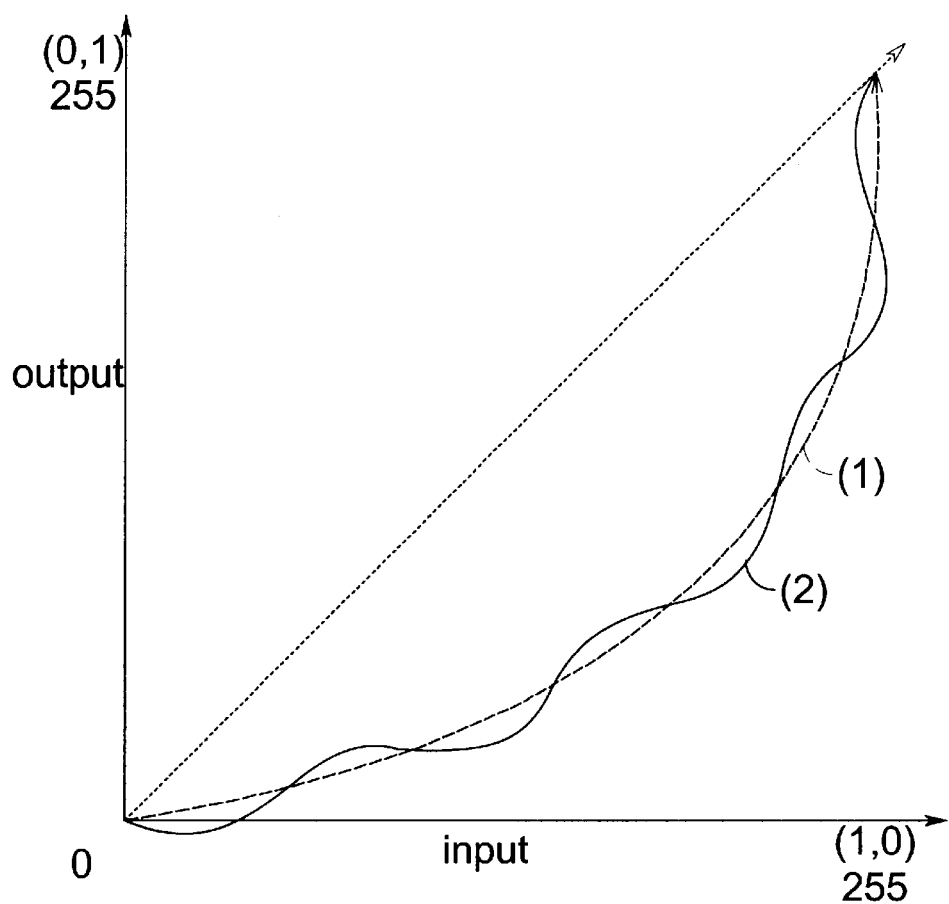
FIG. 2 is a graph showing the relationship between luminance input and output.

The first step of the present invention is to determine or assume a power relationship or gamma correction between the luminance values produced between two physical or logical representations (such as a display and the values in the computer memory). For the purpose of this example, gamma correction equation (1) will be used.

$$L(x,y) = L_{max}(N(x,y)/N_{max})^{\gamma} \quad (1)$$

where $N(x, y)$ is the numerical value at location $(x, y)$, $N_{max}$ is the maximum numerical value of the representation, $L_{max}$ is the luminance corresponding to the maximum numerical value, and $L(x, y)$ is the luminance value to location $(x, y)$. FIG. 2 shows a graphical depiction of gamma correction equation (1) for $\gamma>1$. Alternative gamma correction equations could be used depending on the relationship between the two physical or logical representations.

The next step is to determine a polynomial approximation to the assumed gamma correction equation (1). For example, a polynomial approximation of order m to a given function $F(a)$, $$F_m(a) = \sum_0^m c_i a^i \quad (2)$$

FIG. 2 shows a graphical depiction of a polynomial approximation (2) for $\gamma>1$. If the function $F(\alpha)$ is defined by equation (1), where $\alpha = (N(x,y)/N_{max})$, with a coefficient $\gamma$ of 2.2, then an approximation of $F(\alpha)$ may be given by $$F_5(\alpha) = L_{max}(c_0 + c_1\alpha + c_2\alpha^2 + c_3\alpha^3 + c_4\alpha^4 + c_5\alpha^5) \quad (3)$$

where $c_0 = 0.0002$, $c_1 = 0.0149$, $c_2 = 0.70081$, $c_3 = 0.5201$, $c_4 = 02869$, and $c_5 = 0.0807$. This process is called curve-fitting. Curve-fitting programs are commonly available and would be known to those skilled in the art.

The curve-fitting process can be repeated for other values of $\gamma$ to generate a family of such curves or polynomial approximations. This results in a set of coefficient values $c_i$ that vary with $\gamma$ over some desired range, creating the general fit equation $$F_m(a, \gamma) = \sum_{i=0}^m c_i(\gamma) a^i \quad (4)$$

The next step is to take sets of the coefficient values $c_i$, and fit polynomial approximations to them. Stated another way, in the $5^{th}$-order polynomial approximation example given, all of the $c_0$ values over the given range are grouped together and a polynomial equation is fit to the grouping, all of the $c_1$ values over the given range are grouped together and a polynomial equation is fit to the grouping, all of the $c_2$ values over the given range are grouped together and a polynomial equation is fit to the grouping, all of the $c_3$ values over the given range are grouped together and a polynomial equation is fit to the grouping, all of the $c_4$ values over the given range are grouped together and a polynomial equation is fit to the grouping, and all of the $c_5$ values over the given range are grouped together and a polynomial equation is fit to the grouping. This results in a set of polynomial equations, one for each of the powers in the fit equation (4), that can be used to compute the $c_i$ coefficients. For example, the following equations can be used to compute approximation coefficients for a $5^{th}$-order polynomial approximation to the transformation (1), over the range $1 \leq \gamma \leq 3$:

$$c_0 = -0.00237\gamma^3 + 0.01330\gamma^2 - 0.02172\gamma + 0.00883 \quad (5a)$$

$$c_1 = -0.37937\gamma^3 + 2.75506\gamma^2 - 6.58445\gamma + 5.16790 \quad (5b)$$

$$c_2 = 1.58908\gamma^3 - 10.40233\gamma^2 + 20.91240\gamma - 11.83729 \quad (5c)$$

$$c_3 = -2.59009\gamma^3 + 15.75655\gamma^2 - 28.75751\gamma + 15.02052 \quad (5d)$$

$$c_4 = 1.96316\gamma^3 - 11.51389\gamma^2 + 20.43485\gamma - 10.34658 \quad (5e)$$

$$c_5 = -0.58102\gamma^3 + 3.39483\gamma^2 - 5.98968\gamma + 2.98954 \quad (5f)$$

The respective coefficient polynomial equations may then be used to compute a gamma conversion table using a simplified mathematical formula. Specifically, given a value of $\gamma$ the respective coefficient polynomial equations (such as equations (5a)–(5f)) coefficients $c_0$–$c_5$ can be computed. These values are used in turn with equations (3) or (4) to compute the gamma conversion transformation. The resulting values are then stored in a table that is used for the lookup-based gamma correction.

This approach combines minimal storage requirements (20 floating point numbers, plus 256 integer entries in the lookup table) with efficiency (since a table-lookup conversion is performed during processing) and accuracy (the equations given in (5a)–(5f), with (4), yield a maximum error of 1 part in 256 over the range of $1 \leq \gamma \leq 3$, $0 \leq N(x,y) \leq 255$).

Other orders of polynomial fit are suitable for the creation of both the coefficients and the conversion table. The polynomial equations for the $c_i$ values need not all be the same order. Additionally, smaller ranges of $\gamma$ may be specified, with the range of $\gamma$ extended by multiplying or dividing the resulting approximation $F_m(\alpha,\gamma)$. For example, a set of equations (5a)–(5f) may be computed for the range of $1 \leq \gamma \leq 2$, then for $\gamma > 2$, the approximation of equation (4) may be used by computing $$\alpha^\gamma = \alpha \cdot F(\alpha, \gamma-1) \quad (6)$$

where $1 \leq \gamma-1 \leq 2$. For $\gamma < 1$, the approximation of (4) may be used by computing $$\alpha^\gamma = F(\alpha, \gamma+1)/\gamma \quad (7)$$

where $1 \leq \gamma+1 \leq 2$.

Figure 3:
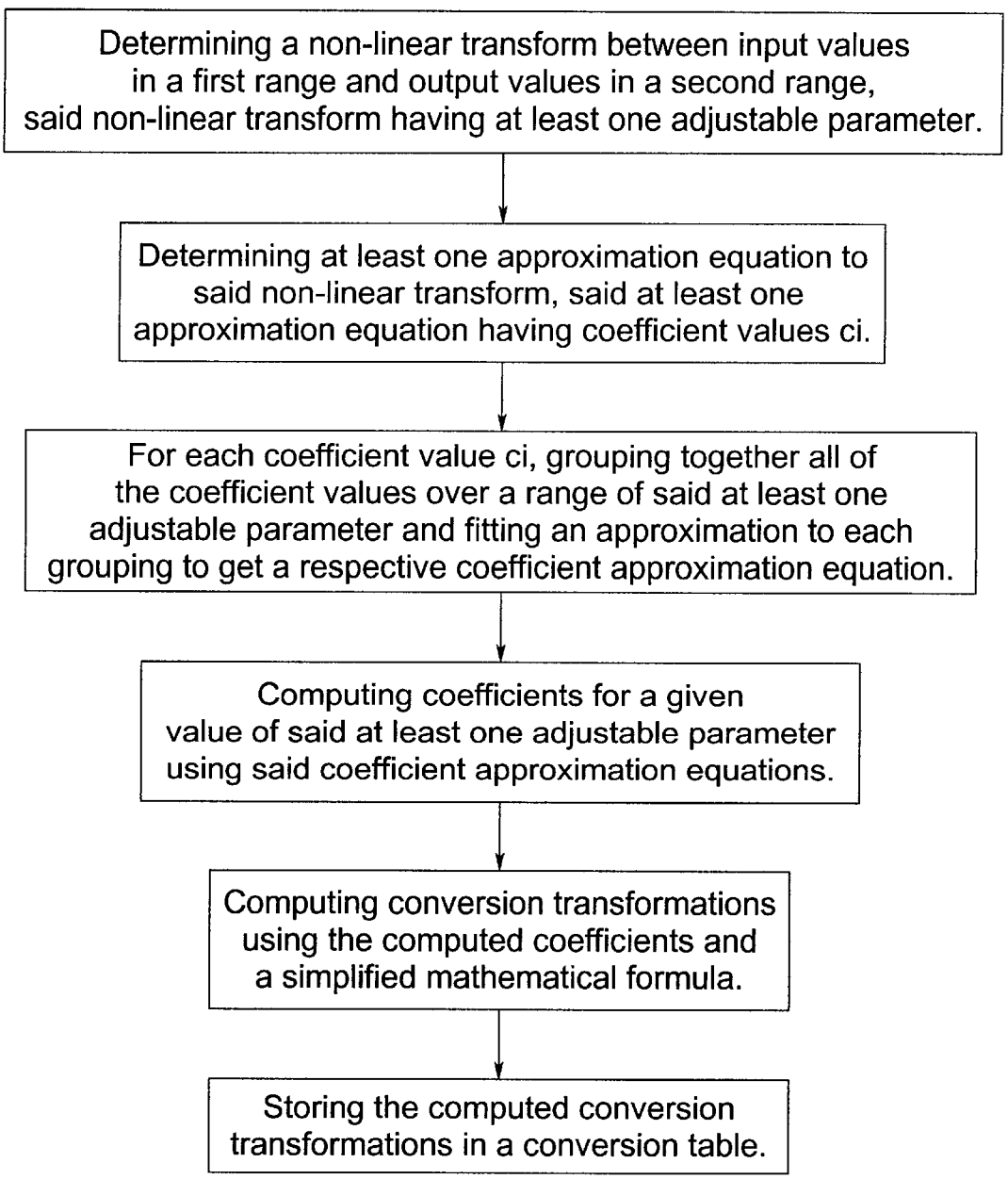
FIG. 3 is a flow chart showing the steps of an exemplary generalized efficient method of computing conversion tables of the present invention.

As shown in FIG. 3, it should be noted that the present invention may be generalized so that the efficient method computes conversion tables generally. Specifically, the general method includes the step of determining a non-linear transform between input values in a first range and output values in a second range, the non-linear transform having at least one adjustable parameter. Next at least one approximation equation to the non-linear transform, having coefficient values $c_i$, is determined. Then, for each coefficient value $c_i$, all of the coefficient values over a range of the at least one adjustable parameter are grouped together and an approximation to each grouping is fit to get a respective coefficient approximation equation. Coefficients for a given value of the at least one adjustable parameter are then computed using the coefficient approximation equations. Conversion transformations are then computed using the computed coefficients and a simplified mathematical formula. Finally, the computed conversion transformations are stored in a conversion table.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. An efficient method of computing conversion tables for performing gamma conversion transformation on a pixel-by-pixel basis between two representations of an image, said method comprising the steps of:

(a) determining a non-linear transform between input values in a first range and output values in a second range, said non-linear transform having at least one adjustable parameter;

(b) determining at least one approximation equation to said non-linear transform, said at least one approximation equation having coefficient values $c_i$;

(c) for each coefficient value $c_i$, grouping together all of the coefficient values over a range of said at least one adjustable parameter and fitting an approximation to each grouping to get a respective coefficient approximation equation;

(d) computing coefficients for a given value of said at least one adjustable parameter using said coefficient approximation equations;

(e) computing conversion transformations using the computed coefficients and a simplified mathematical formula; and (f) storing the computed conversion transformations in a conversion table.

2. The method of claim 1 wherein said non-linear transform is a gamma correction equation.

3. The method of claim 1 wherein said input values in a first range being luminance values produced in a first representation and said output values in a second range being luminance values produced in a second representation.

4. The method of claim 1 wherein said approximation equations are polynomials.

5. An efficient method of computing gamma correction tables for performing correction transformation on a pixel-by-pixel basis between two representations of an image, said method comprising the steps of:

(a) determining a gamma correction equation between luminance values produced between two representations;

(b) determining at least one polynomial approximation to said gamma correction equation, said at least one polynomial approximation having coefficient values $c_i$;

(c) for each coefficient value $c_i$, grouping together all of the coefficient values over a range of $\gamma$ and fitting a polynomial equation to each grouping to get a respective coefficient polynomial equation;

(d) computing coefficients for a given value of $\gamma$ using the coefficient polynomial equations;

(e) computing gamma conversion transformations using the computed coefficients and a simplified mathematical formula; and (f) storing the computed gamma conversion transformations in a gamma correction table.

6. The method of claim 5 wherein said step of determining a gamma correction equation further comprises the step of assuming a gamma correction equation between luminance values produced between two representations.

7. The method of claim 5 wherein said steps of computing coefficients, computing gamma conversion transformations, and storing the computed gamma conversion transformations are repeated if $\gamma$ is changed.

8. The method of claim 5 wherein said step of determining a gamma correction equation between the luminance values produced between two representations further comprises the step of determining the gamma correction equation $$L(x,y) = L_{max}(N(x,y)/N_{max})^\gamma.$$

9. The method of claim 5 wherein said step of determining a polynomial approximation further comprises the step of using a curve-fitting program to determine a polynomial approximation to said assumed gamma correction equation.

10. The method of claim 5 wherein said step of determining a polynomial approximation further comprises the step of determining the polynomial approximation $$F_m(a) = \sum_0^m c_i a^i.$$

11. The method of claim 5 further comprising the step of generating a family of polynomial approximations having coefficient values $c_i$ that vary with $\gamma$ over a range.

12. The method of claim 11 wherein said step of generating a family of polynomial approximations further comprises repeating a curve-fitting process for other values of $\gamma$ to generate said family of polynomial approximations.

13. The method of claim 11 wherein said step of generating a family of polynomial approximations described by a general fit equation $$F_m(a, \gamma) = \sum_{i=0}^{m} c_i(\gamma)a^i.$$

14. The method of claim 5, in a $5^{th}$-order polynomial approximation, said step of, for each coefficient value $c_i$, grouping together all of the coefficient values and fitting a polynomial equation to each grouping to get a respective coefficient polynomial equation further comprising the steps of:
 (a) grouping together all of the $c_0$ values over the given range and fitting a polynomial equation to the grouping;
 (b) grouping together all of the $c_1$ values over the given range and fitting a polynomial equation to the grouping;
 (c) grouping together all of the $c_2$ values over the given range and fitting a polynomial equation to the grouping;
 (d) grouping together all of the $c_3$ values over the given range and fitting a polynomial equation to the grouping;
 (e) grouping together all of the $c_4$ values over the given range and fitting a polynomial equation to the grouping; and
 (f) grouping together all of the $c_5$ values over the given range and fitting a polynomial equation to the grouping.

15. The method of claim 5 wherein said step of computing said gamma conversion transformations further comprises the step of computing said gamma conversion transformations using the computed coefficients and general fit equation $$F_m(a, \gamma) = \sum_{i=0}^{m} c_i(\gamma)a^i.$$

16. The method of claim 5 further comprising the step performing gamma correction transformation on a pixel-by-pixel basis using said gamma conversion transformations stored in said gamma correction table.

17. A method of computing gamma correction tables for performing gamma correction transformation on a pixel-by-pixel basis between two representations of an image, said method comprising the steps of:
 (a) assuming a gamma correction equation between luminance values produced between said two representations;
 (b) fitting a family of polynomial approximations to said gamma correction equation, said family having coefficient values $c_i$ that vary with $\gamma$ over a range;
 (c) for each coefficient value $c_i$, grouping together all of the coefficient values and fitting a polynomial equation to each grouping to get a respective coefficient polynomial equation;
 (d) computing coefficients for a given value of $\gamma$ using the coefficient polynomial equations;
 (e) computing gamma conversion transformations using the computed coefficients and a simplified mathematical formula; and
 (f) storing the computed gamma conversion transformations in a gamma correction table.

18. The method of claim 17 wherein said steps of computing coefficients, computing gamma conversion transformations, and storing the computed gamma conversion transformations are repeated if $\gamma$ is changed.

19. The method of claim 17 wherein said step of determining a gamma correction equation between the luminance values produced between two representations further comprises the step of determining the gamma correction equation $$L(x,y)=L_{max}(N(x,y)/N_{max})^\gamma.$$

20. The method of claim 17 further comprising the step of determining a polynomial approximation to said gamma correction equation.

21. The method of claim 20 wherein said step of determining a polynomial approximation further comprises the step of using a curve-fitting program to determine a polynomial approximation to said assumed gamma correction equation.

22. The method of claim 20 wherein said step of determining a polynomial approximation further comprises the step of determining the polynomial approximation $$F_m(a) = \sum_0^m c_i a^i.$$

23. The method of claim 17 wherein said step of generating a family of polynomial approximations further comprises repeating a curve-fitting process for other values of $\gamma$ to generate said family of polynomial approximations.

24. The method of claim 23 wherein said step of generating a family of polynomial approximations described by a general fit equation $$F_m(a, \gamma) = \sum_{i=0}^{m} c_i(\gamma)a^i.$$

25. The method of claim 17, in a $5^{th}$-order polynomial approximation, said step of, for each coefficient value $c_i$, grouping together all of the coefficient values and fitting a polynomial equation to each grouping to get a respective coefficient polynomial equation further comprising the steps of:
 (a) grouping together all of the $c_0$ values over the given range and fitting a polynomial equation to the grouping;
 (b) grouping together all of the $c_1$ values over the given range and fitting a polynomial equation to the grouping;
 (c) grouping together all of the $c_2$ values over the given range and fitting a polynomial equation to the grouping;
 (d) grouping together all of the $c_3$ values over the given range and fitting a polynomial equation to the grouping;
 (e) grouping together all of the $c_4$ values over the given range and fitting a polynomial equation to the grouping; and
 (f) grouping together all of the $c_5$ values over the given range and fitting a polynomial equation to the grouping.

26. The method of claim 17 wherein said step of computing said gamma conversion transformations further comprises the step of computing said gamma conversion transformations using the computed coefficients and general fit equation $$F_m(a, \gamma) = \sum_{i=0}^{m} c_i(\gamma)a^i.$$

27. The method of claim 17 further comprising the step performing gamma correction transformation on a pixel-by-pixel basis using said gamma conversion transformations stored in said gamma correction table.

* * * * *

UNITED STATES PATENT AND TRADEMARK OFFICE
CERTIFICATE OF CORRECTION

PATENT NO. : 6,771,839 B2
DATED : August 3, 2004
INVENTOR(S) : Westerman

It is certified that error appears in the above-identified patent and that said Letters Patent is hereby corrected as shown below:

Column 4,
Line 7, "$F(\alpha)$" should read -- $F(a)$ --;
Line 8, "$(\alpha=(N(x,y)/N_{max})$," should read -- $(a=(N(x,y)/N_{max})$, --;
Line 9, "$F(\alpha)$" should read -- $F(a)$ --;
Line 11, "$F_5(\alpha)=L_{max}(c_0+c_1\alpha+c_2\alpha^2+c_3\alpha^3+c_4\alpha^4+c_5\alpha^5)$" should read -- $F_5(a)=L_{max}(c_0+c_1a+c_2a^2+c_3a^3+c_4a^4+c_5a^5)$ --;
Line 13, "$c_4=02869$," should read -- $c_4=0.2869$, --;
Line 46, "$1 \leqq \gamma \leqq 3$:" should read -- $1 \leq \gamma \leq 3$: --; and
Line 67, "floating point" should read -- floating-point --.

Column 5,
Lines 4 and 5, "$1 \leqq \gamma \leqq 3, 0 \leqq N(x,y) \leqq 225)$." should read -- $1 \leq \gamma \leq 3, 0 \leq N(x,y) \leq 225)$. --;
Line 11, "$F_m(\alpha,\gamma)$." should read -- $F_m(a,\gamma)$. --;
Line 13, "$1 \leqq \gamma \leqq 2$," should read -- $1 \leq \gamma \leq 3$, --;
Line 16, "$\alpha^\gamma=\alpha \bullet F(\alpha,\gamma-1)$" should read -- $a^\gamma = a \bullet F(a,\gamma-1)$ --;
Line 18, "$1 \leqq \gamma-1 \leqq 2$." should read -- $1 \leq \gamma-1 \leq 2$. --; and
Line 20, "$\alpha^\gamma=F(\alpha,\gamma+1)/\gamma$" should read -- $a^\gamma = a \bullet F(a,\gamma+1)/\gamma$ --;
Line 22, "$1 \leqq \gamma+1 \leqq 2$." should read -- $1 \leq \gamma+1 \leq 2$. --.

Column 6,
Line 15, "performing" should read -- performing gamma --.

Column 8,
Line 62, "step" should read -- step of --.

Signed and Sealed this

Twenty-eighth Day of February, 2006

JON W. DUDAS
*Director of the United States Patent and Trademark Office*